W. A. HENDERSON.
TEST PLUG.
APPLICATION FILED AUG. 28, 1916.

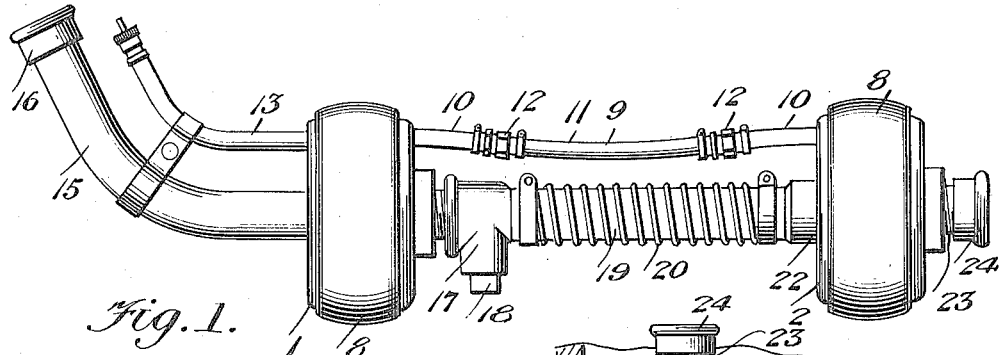
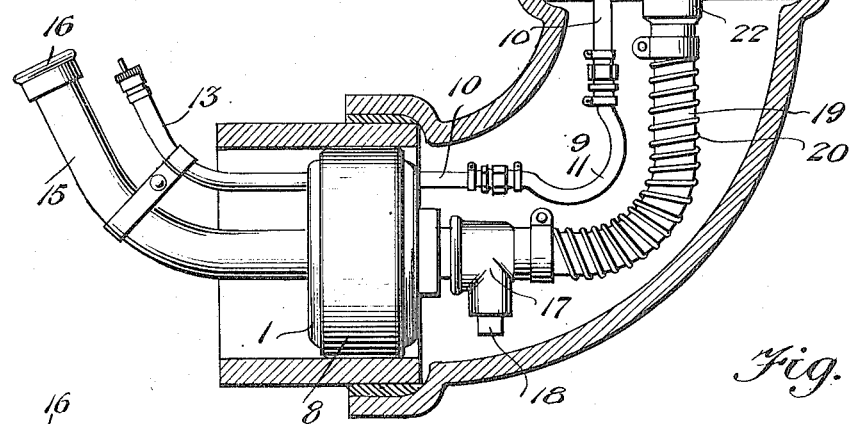
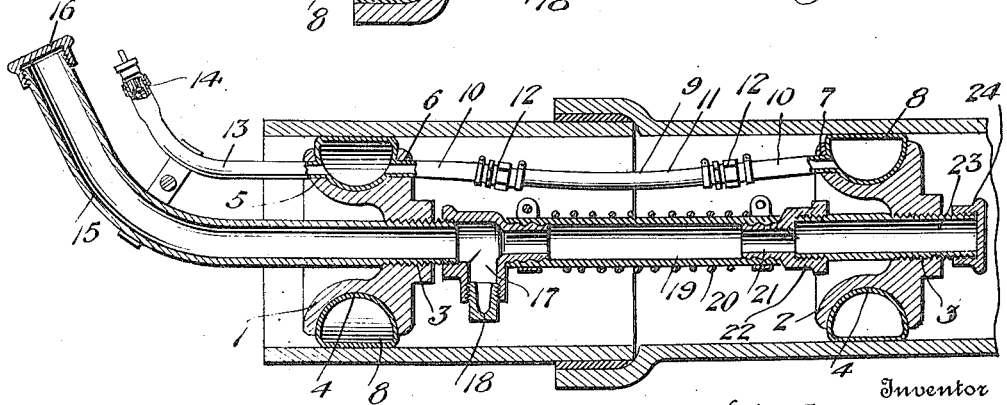

1,221,733. Patented Apr. 3, 1917.
2 SHEETS—SHEET 2.

Inventor
W. A. Henderson
By Victor J. Evans
Attorney

Witness

UNITED STATES PATENT OFFICE.

WATT A. HENDERSON, OF BIRMINGHAM, MICHIGAN.

TEST-PLUG.

1,221,733.　　　　　Specification of Letters Patent.　　Patented Apr. 3, 1917.

Application filed August 28, 1916. Serial No. 117,348.

*To all whom it may concern:*

Be it known that I, WATT A. HENDERSON, a citizen of the United States, residing at Birmingham, in the county of Oakland and State of Michigan, have invented new and useful Improvements in Test-Plugs, of which the following is a specification.

This invention relates to a test plug used to obstruct the passage of a pipe when tests are made to determine whether a pipe system is perfect.

The primary object of the invention is to so construct a test plug that the same will be capable of assuming a plurality of angular positions so as to obstruct any of the curved passages used in the art of plumbing.

An object of the invention is the use of a hollow flexible ring for accomplishing an air tight connection between the plug and the pipe to which it is applied, air being forced into the rings for obtaining any pressure desired between the rings and the pipe.

Besides the above my invention is distinguished in the use of two pipe obstructing members flexibly connected together so that the members may assume different angular relations with each other.

With these and other objects in view the invention will be better understood from the following detailed description taken in connection with the accompanying drawings, wherein—

Figure 1 is a side elevation of my invention shown in its normal position.

Fig. 2 is a view similar to Fig. 1 showing my plug obstructing an elbow.

Fig. 3 is a longitudinal sectional view through Fig. 1.

Figure 4:
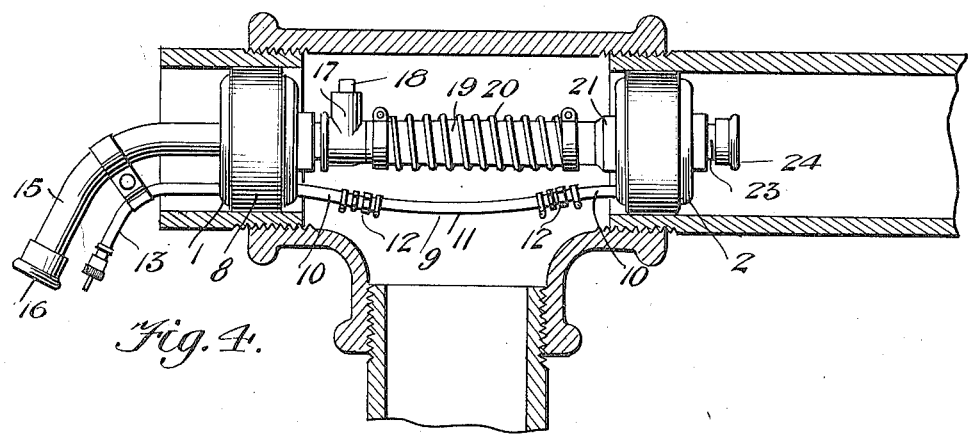
Fig. 4 is a view similar to Fig. 3 showing the plug arranged to obstruct the T joint while at the same time establishing communication between one limb of the T and the atmosphere.
Figure 5:
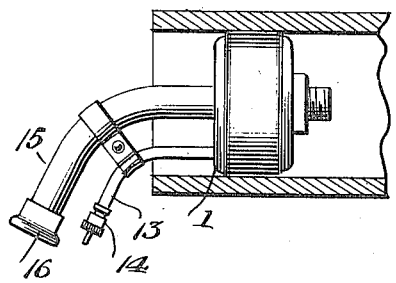
Fig. 5 is a view illustrating the use of a single collar for obstructing a pipe.

At the beginning I wish to call attention to the fact that although the following description is for a test plug using a pair of obstructing members I do not wish to be limited to this number as one may be used as illustrated in Fig. 5 of the drawings or a plurality depending entirely upon the result to be accomplished.

Referring to the drawings and more particularly to Figs. 1 to 6 inclusive the numerals 1 and 2 designate a pair of collars each formed with a threaded bore 3 and an annular groove 4 shown in this particular instance semi-circular in cross section. The collar 1 is provided with a slot 5 and an opening 6 in alinement with the slot whereas the collar 2 is provided with a single opening 7. Lodged within the groove of each collar is a hollow flexible ring 8 arranged when the plug is in use to flatten against the interior surface of the pipes to be tested. The rings are connected together by a hose 9 formed of sections 10 directly connected to the ring at an intermediate section 11 having a detachable connection with the sections 10 by means of the coupling 12. Communicating with one of the rings is a pipe 13 terminating in a valve 14 adapted to control the passage of air or any other fluid to the rings. Passing through and having screw threaded engagement with the collar 1 is a curved pipe section 15, one end of which is closed by a cap 16, while the other end has screw threaded engagement with a limb of the Y coupling 17. Another limb of this coupling 17 is arranged to communicate with the space between the collars but may be obstructed by the plug 18. The remaining limb of the coupling has secured thereto one end of a flexible tube 18 that has encircling it coils of wire 20 for giving a certain amount of rigidity to the tube. The remaining end of the tube 19 is clamped upon the extension 21 of a unit 22 that in turn connects to a pipe section 23 passing through and having screw threaded engagement with the collar 2. The remaining end of the section 23 that is arranged exteriorly of the collar 2 is closed by a cap 24.

From the foregoing description it will be seen that by forcing air into the ring, the pressure between the ring and the interior surface of the pipe to be tested can be controlled at will so as to withstand any pressure to which the plug is subjected.

A very important feature of my invention is that the testing fluid may be passed into the pipe 15 and make its exit therefrom through one limb of the coupling 17 or through the pipe 23 depending entirely whether the passage to be tested is arranged in alinement with the plug or at right angles thereto.

Another feature of my invention is the arrangement of the flexible hose 19 so that the plug may be bent at this point for disposing the collars at different angles to each other.

Figure 7:
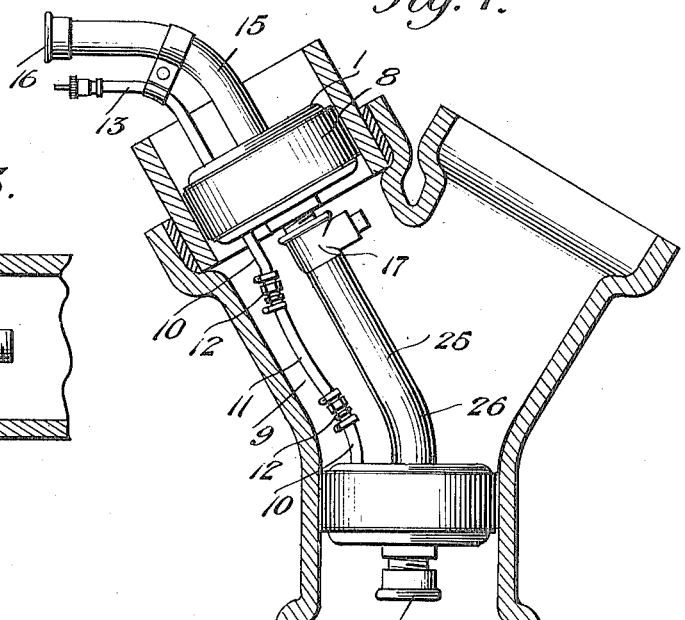
Fig. 7 is a view of a modified form of my invention.
Figure 6:
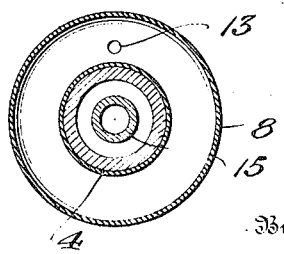
Fig. 6 is a transverse sectional view through one of the collars and associated ring.

In Fig. 7 of the drawings I have shown a pair of collars and rings constructed and connected together identical with that just described, the only difference being that the collars are mounted upon a rigid pipe 25 bent at a point between the collars as indicated at 26 so as to allow the collars and rings to obstruct two of the passages of the Y pipe joint.

It should be apparent from the foregoing explanation that I provide a device which is admirably adapted for the purpose for which it is intended, that the device is simple, durable and efficient of construction and may be manufactured and sold at a comparatively low cost.

What I claim is:—

1. A test plug comprising a pair of collars, a flexible tube connecting the collars together and communicating with the space between the collars and pipe sections establishing communication between said tube and a point beyond said collars, and a hollow flexible ring encircling each of said collars and having a valve controlled inlet.

2. A test plug comprising a pair of collars, a flexible tube connecting the collars together and communicating with the space between the collars and pipe sections establishing communication between said tube and a point beyond said collars, a pair of hollow flexible rings encircling said collars one of which is provided with a valve controlled inlet, and a flexible hose establishing communication between the rings.

3. A test plug comprising a pair of collars each having an annular groove, a hollow flexible ring mounted in the groove of each collar, a flexible hose establishing communication between the rings, a valve controlled pipe communicating with one of the rings, a pipe section passing through and having screw threaded engagement with each collar, a joint having screw threaded engagement with one of the sections and having an outlet port, and a flexible tube establishing communication between said joint and the other pipe section.

In testimony whereof I affix my signature.

WATT A. HENDERSON.